United States Patent [19]

Tabor

[11] Patent Number: 4,467,548
[45] Date of Patent: Aug. 28, 1984

[54] FISHING ROD HANDLE ASSEMBLY

[76] Inventor: David R. Tabor, 3730 Nashville St., Orlando, Fla. 32809

[21] Appl. No.: 338,547

[22] Filed: Jan. 11, 1982

[51] Int. Cl.$^3$ .............................................. A01K 87/02
[52] U.S. Cl. ......................................... 43/23; 43/25.2
[58] Field of Search .......................... 43/23, 25.2, 18.1; 220/4 D, 23.6; 206/503, 499, 537; 215/10; 145/62, 63; 30/125

[56] References Cited

U.S. PATENT DOCUMENTS

| 2,018,923 | 10/1935 | Potter | 43/18.1 |
|---|---|---|---|
| 2,496,707 | 2/1950 | Frye | 16/110.5 |
| 2,830,399 | 4/1958 | Davis | 43/23 |
| 2,914,881 | 12/1959 | Williams | 43/23 |
| 3,073,055 | 1/1963 | Edwards | 43/23 |
| 3,261,669 | 7/1966 | Eisenhauer | 220/4 D |
| 4,084,343 | 4/1978 | Genovese | 43/23 |

FOREIGN PATENT DOCUMENTS 694934  9/1965  Italy ...................................... 43/25.2

Primary Examiner—Nicholas P. Godici
Assistant Examiner—Marc Hodak
Attorney, Agent, or Firm—Charles N. Hilke

[57] ABSTRACT

A fishing rod handle assembly with a hollow handle into which the base of a rod is secured and into which a series of attachable and interchangeable storage compartments, the bottom of each storage compartment forming the top of the next storage compartment by attachable means, may be inserted slideably into a hollow handle with attachable means in the end cap attaching to the hollow handle and with additional attachable means in the end cap attaching to a storage compartment.

1 Claim, 3 Drawing Figures

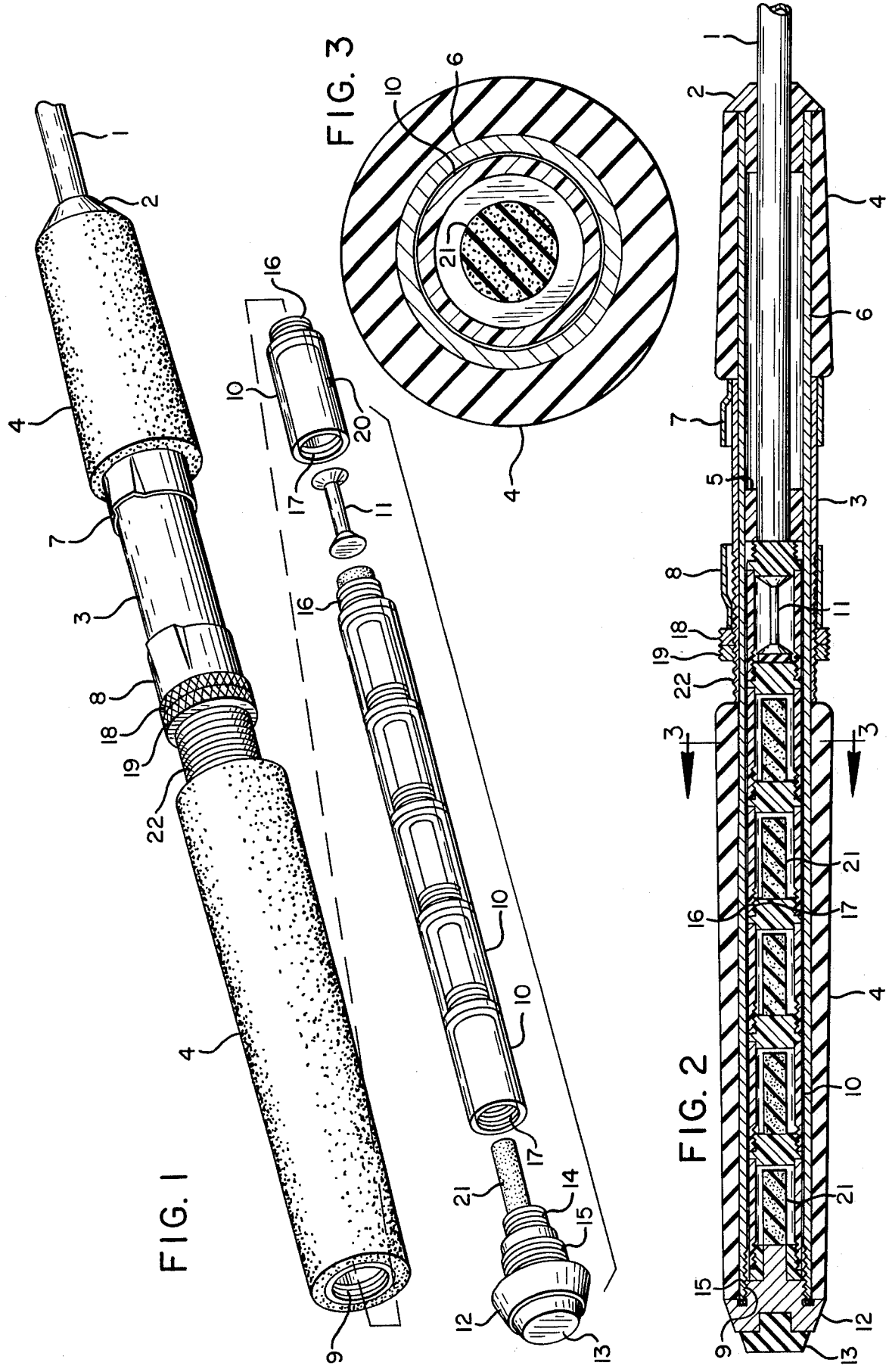

FISHING ROD HANDLE ASSEMBLY

BACKGROUND OF THE INVENTION

This invention relates to the use of a series of storage compartments in a fishing rod handle easily accessible to the fisherman. Other designs for storage compartments have been developed previously. U.S. Pat. No. 1,458,057 discloses one storage compartment divided by a circular disc inserted into a semi-cylinder storage compartment which is contained within the fishing rod handle. U.S. Pat. No. 2,830,399 provides a series of cork blocks screwably mounted to the fishing rod or handle for storage of flies and hooks. U.S. Pat. No. 2,526,293 provides a single storage compartment with hinges in the fishing rod handle. U.S. Pat. No. 4,084,343 provides hollow handle extensions used for storage and for balancing the fishing rod in ocean fishing and light fly fishing. In general, previously described patents suffer from one or more of the following flaws: the material stored is loose and can rattle around within the storage compartment; the design is bulky; the design makes difficult easy access to the material; only one kind of fishing gear (e.g. hooks) can be stored; and either the entire compartment must be removed or the handle disassembled. The resolution of these flaws is extremely desirable.

SUMMARY OF THE INVENTION

The present invention provides several interconnected storage compartments for storing several different kinds of fishing equipment, e.g. hooks, sinkers, fishing line, swivels, and flies. Each of the storage compartments is individually accessible as the bottom of the interconnected storage compartment forms the top of the next interconnected storage compartment. The end cap of the handle is attached to the handle and is separately attached to the top portion of one of the storage compartments.

The present invention also simply joins both the rod and the storage compartments within a single hollow handle.

The use of two supports of the rod within the hollow handle increases the fishing rod's strength and flexibility.

With the foregoing in mind, it is the primary object of the invention to provide novel storage compartments and a novel means of supporting the fishing rod.

A further object is to provide for easy storage of fishing equipment in the handle of a fishing rod whereby the equipment stored is secure, separate, and easily and individually accessible.

These and other objects and advantages of the present invention will become more apparent as the following description proceeds.

To the accomplishment of the foregoing and related ends, the invention, then, provides that the features hereinafter fully described and particularly pointed out in the claims, the following description and the annexed drawings set forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a perspective view of the hollow handle showing the series of storage compartments removed from the hollow handle.

FIG. 2 is a side elevation view, partly in section, showing the handle, the series of storage compartments, the front and rear rod supports and a part of the rod.

FIG. 3 is a cross-section of the handle and compartments looking in the direction of the arrows 3—3 of FIG. 2.

DESCRIPTION OF THE PREFERRED EMBODIMENT

Referring now more particularly to the drawings, FIG. 2 shows the relationship of all of the components of the fishing rod handle assembly. The rod 1 is fixably fastened at one point to the hollow handle 6 by the forward rod support 2 and the rear rod support 5. A forward portion and rearward portion of pliable grips 4 covers the outside of the hollow handle 6. The central portion of the hollow handle 6 is surrounded by a sleeve 3 (seen more clarly in FIG. 1) where the rear of the sleeve 3 has grooves 22 for the adjustment of the rear reel fastener 8 by means of the adjustable ring 18 and the friction locking ring 19. Forward reel fastener 7 is also attached to the sleeve 3.

Referring now to FIG. 1, the end cap 12 contains screw threads 15 to engage screw threads 9 at the inside rear of the hollow handle 6. The end cap 12 also contains screw threads 14 to engage screw threads 17 at the top of the storage compartments 10. The bottom of the storage compartments 10 contain screw threads 16 which engage screw threads 17 at the top of the storage compartments 10. Note that screw threads 14 of the end cap 12 and screw threads 16 of the storage compartments 10 are the same size. The storage compartments 10 are of clear or translucent material so that the items stored are readily visible. Damping 21 is attached to the end cap 12 and each storage compartment 10 (see FIG. 2). The end cap 12 contains a non-skid stopper 13. The storage compartments 10 contain a hole 20 through which fishing line from spool 11 may be directed. This obviates the need for opening the storage compartment 10 to get additional fishing line.

FIG. 3 is a cross-sectional view showing the relationship of the pliable grips 4 to the hollow handle 6 and the relationship of the storage compartment 10 and the damping 21, a flexible spongy material.

To expose the storage compartments 10, the end cap 12 is screwably disengaged from the hollow handle 6. The end cap 12 is then moved away from the fishing rod handle assembly thus exposing some or all of the storage compartments 10. Since the storage compartments 10 are made of clear material, the fishing equipment contained therein is readily visible. Simply disengage the storage compartments 10 or the one storage compartment 10 from the end cap 12 for easy access. Of course, the fishing line may be pulled through hole 20 obviating the need to open that storage compartment 10. Reversing the process results in the storage compartments 10 secured within the hollow handle 6.

Although the invention has been shown and described with respect to a preferred embodiment, it is obvious that equivalent alterations and modifications will occur to others skilled in the art on the reading and understanding of this specification. The present invention includes all such equivalent alterations and modifications, and is limited only by the scope of the claims.

What I claim is:

1. A fishing rod handle assembly comprising:
   (a) a hollow tube into which an end cap is screwably connected;
   (b) the end cap with screwable means for connecting to the hollow tube having separate additional screwable means for attaching storage compartments;
   (c) interconnected and interchangeable storage compartments within said hollow tube wherein the bottom of one of said storage compartments is screwably attached to the end cap and wherein the closed top of each storage compartment screwably attaches to the open bottom of each adjacent storage compartment;
   (d) means for damping motion in said compartments attached to said end cap and to a plurality of the tops of said storage compartments; and
   (e) a rod fixably fastened within said hollow tube by a forward rod support and a rear rod support.

* * * * *